US007580067B2

(12) United States Patent
Kim et al.

(10) Patent No.: US 7,580,067 B2
(45) Date of Patent: Aug. 25, 2009

(54) METHOD FOR MANAGING DIGITAL SLOW SHUTTER MODE IN MONITOR CAMERA

(75) Inventors: Man Sung Kim, Suwon-si (KR); Shin Kyu Park, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 10/921,804

(22) Filed: Aug. 20, 2004

(65) Prior Publication Data

US 2005/0078206 A1 Apr. 14, 2005

(30) Foreign Application Priority Data

Aug. 20, 2003 (KR) .................. 10-2003-0057534
Aug. 13, 2004 (KR) .................. 10-2004-0063786

(51) Int. Cl.
*H04N 5/238* (2006.01)
*H04N 5/262* (2006.01)
*H04N 5/235* (2006.01)
*H04N 5/335* (2006.01)

(52) U.S. Cl. ................. 348/239; 348/363; 348/229.1; 348/296

(58) Field of Classification Search ........... 348/239, 348/218.1, 363
See application file for complete search history.

(56) References Cited

U.S. PATENT DOCUMENTS

| 4,392,123 | A | 7/1983 | Bruggemann |
| 5,335,075 | A | 8/1994 | Komiya et al. |
| 5,420,629 | A | 5/1995 | Watanabe |
| 5,926,216 | A | 7/1999 | Nobuoka |
| 6,542,202 | B2 * | 4/2003 | Takeda et al. ............... 348/255 |
| 7,064,778 | B1 * | 6/2006 | Waehner ................. 348/211.11 |

FOREIGN PATENT DOCUMENTS

EP 1 067 778 A2 1/2001

OTHER PUBLICATIONS

Dubois et al., "Handbook of Image and Video Processing, Video Sampling and Interpolation," XP-002382871, Acedemic Press, 2000, pp. 645-654.
Lagendijk, "Handbook of Image and Video Processing, Video Enhancement and Restoration, Spatiotemporal Noise Filtering," XP-002382870, Acedemic Press, 2000, pp. 227-230, 241.

\* cited by examiner

*Primary Examiner*—Nhan T Tran
(74) *Attorney, Agent, or Firm*—Birch, Stewart, Kolasch & Birch, LLP

(57) ABSTRACT

Disclosed is a method for managing a DSS (Digital Slow Shutter) mode in a monitoring camera. When an iris of the monitoring camera is maximally opened and a shutter speed is minimum, the DSS mode is set. In the DSS mode, a video frame inputted in a predetermined cycle is stored in a memory. A plurality of video frames stored in the memory are synthesized into a monitoring video frame. The monitoring video frame is outputted irrespective of a luminance thereof. When the memory is full of the video frames, an oldest stored video frame is replaced with a newly inputted video frame. The monitoring video frame can be consecutively outputted in a predetermined cycle even though the monitoring camera operates in the DSS mode. The monitoring video frame based on a bright luminance level can be outputted, such that a monitoring function is enhanced.

16 Claims, 6 Drawing Sheets

METHOD FOR MANAGING DIGITAL SLOW SHUTTER MODE IN MONITOR CAMERA

This Non-provisional application claims priority under 35 U.S.C. § 119(a) on Patent Application No(s). 03-57534 and 04-63786 filed in Korea on Aug. 20, 2003 and Aug. 13, 2004, respectively, the entire contents of which are hereby incorporated by reference.

BACKGROUND OF THE INVENTION

1. Field of the Invention

The present invention relates to a method for managing a DSS (Digital Slow Shutter) mode in a monitoring camera, and more particularly to a method for normally outputting a monitoring video frame in a DSS mode.

2. Description of the Related Art

FIG. 1 is a block diagram illustrating the configuration of a conventional monitoring camera to which a method for managing a DSS (Digital Slow Shutter) mode is applied. The conventional monitoring camera includes a lens 10, an iris 11, a CCD (Charge Coupled Device) 12, an A/D (Analog-to-Digital) converter 13, a DSP (Digital Signal Processor) 14, a memory (buffer) 15 and a microcomputer 16. The lens 10 can manually or automatically perform a focusing function and/or a zooming function. The A/D converter 13 converts video signals inputted from the CCD 12 into digital video data. The DSP 14 generates a video frame from the digital video data. The microcomputer 16 controls operations of the CCD 12, the A/D converter 13, the DSP 14 and the memory 15.

Because an amount of light incoming through the lens 10 is too small when the monitoring camera operates in a dark place where the luminance is very low, the microcomputer 16 performs an iris control operation for gradually opening the iris 11 so that an amount of incident light can increase. Moreover, the microcomputer 16 performs a CCD shutter speed control operation for gradually reducing the shutter speed of the CCD 12 so that an electrical signal level based on photoelectric conversion of the CCD 12 can be set to a certain level appropriate for signal processing.

When the iris 11 is maximally opened and simultaneously the shutter speed of the CCD 12 is minimum while the control operation is carried out, the microcomputer 16 automatically sets the DSS mode.

FIG. 2 is a flowchart illustrating the method for managing the DSS mode in the conventional monitoring camera. The monitoring camera installed in an arbitrary place performs a series of operations for outputting a video frame captured in a predetermined cycle, for example, a 1/30-second cycle, as a monitoring video frame (S10). As described above, when an amount of light incoming through the lens 10 is small, the microcomputer 16 performs an iris control operation for gradually opening the iris 11 and a CCD shutter speed control operation for gradually reducing the shutter speed of the CCD 12.

When the iris 11 is maximally opened (S11) and simultaneously, the shutter speed of the CCD 12 is minimum (S12) through the above-descried operation, the microcomputer 16 automatically sets the DSS mode (S13). In the DSS mode, the microcomputer 16 generates an output video frame by accumulating digital video data of consecutive video frames so that the output video frame can have a predetermined luminance or more.

The microcomputer 16 controls the A/D converter 13 and the DSP 14 to convert a weak video signal from the CCD 12 into digital video data and to generate a video frame by accumulating the digital video data, and temporarily stores the generated video frame in the memory 15 (S14). At this point, the microcomputer 16 checks the luminance of the temporarily stored video frame (S15).

When the luminance of the temporarily stored video frame is lower than a preset reference luminance (corresponding to a video frame recognizable by a user) as a result of the check (S16), the temporarily stored video frame is not outputted. As digital video data of the video frame temporarily stored in the memory 15 and digital video data of a newly inputted video frame are accumulated, an operation for generating a new video frame is continued.

On the other hand, when the luminance of the video frame temporarily stored in the memory 15 is equal to or greater than the preset reference luminance as the result of the check (S16), the video frame temporarily stored in the memory 15 is output as a monitoring video frame and then is deleted (S17). Until a system operation is terminated, the above steps (S14-S17) are iterated.

Accordingly, even though the monitoring camera operates in a dark place where the luminance is very low, the DSS mode operates, such that a monitoring video frame based on a luminance level recognizable by the user can be outputted.

However, because the conventional monitoring camera accumulates digital video data and continuously performs a temporarily storing operation without outputting a video frame until the luminance of a video frame temporarily stored in the memory is equal to or greater than a preset reference in the DSS mode, a monitoring video frame to be outputted in a predetermined cycle is cut off and delayed. For this reason, there is a problem in that a monitoring function is degraded.

SUMMARY OF THE INVENTION

Therefore, the present invention has been made in view of the above and other problems, and it is an object of the present invention to provide a method capable of consecutively outputting a monitoring video frame in a predetermined cycle even though a monitoring camera operates in a DSS (Digital Slow Shutter) mode in a dark place where the luminance is very low.

In accordance with an aspect of the present invention, the above and other objects can be accomplished by the provision of a method for managing a DSS (Digital Slow Shutter) mode in a monitoring camera, comprising: storing, in a memory, a video frame inputted in a predetermined cycle in the DSS mode; synthesizing a plurality of video frames stored in the memory into a monitoring video frame; and outputting the monitoring video frame irrespective of a luminance thereof. Preferably, the video frame inputted in the predetermined cycle is stored in the memory in a video frame unit. Preferably, an oldest stored video frame is replaced with a newly inputted video frame when the memory is full of the video frames. Preferably, the monitoring video frame is outputted in the predetermined cycle in which the video frame is inputted or in a cycle corresponding to N multiple of the predetermined cycle, the N being a natural number greater than 1. Preferably, the monitoring video frame is controlled and outputted in an average luminance between the synthesized video frames.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a method for managing a DSS (Digital Slow Shutter) mode in a monitoring camera in accordance with preferred embodiments of the present invention will be described in detail with reference to the annexed drawings.

Figure 1:
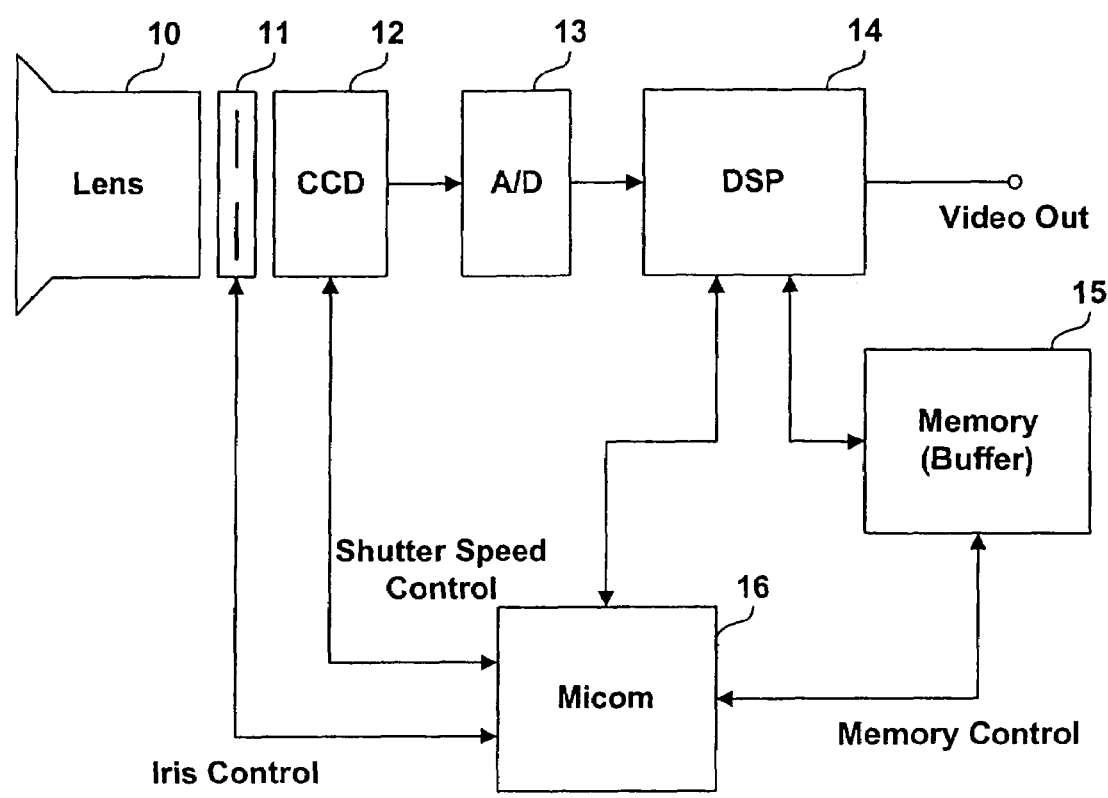
FIG. 1 is a block diagram illustrating the configuration of a conventional monitoring camera to which a method for managing a DSS (Digital Slow Shutter) mode digital slow shutter mode is applied.
Figure 2:
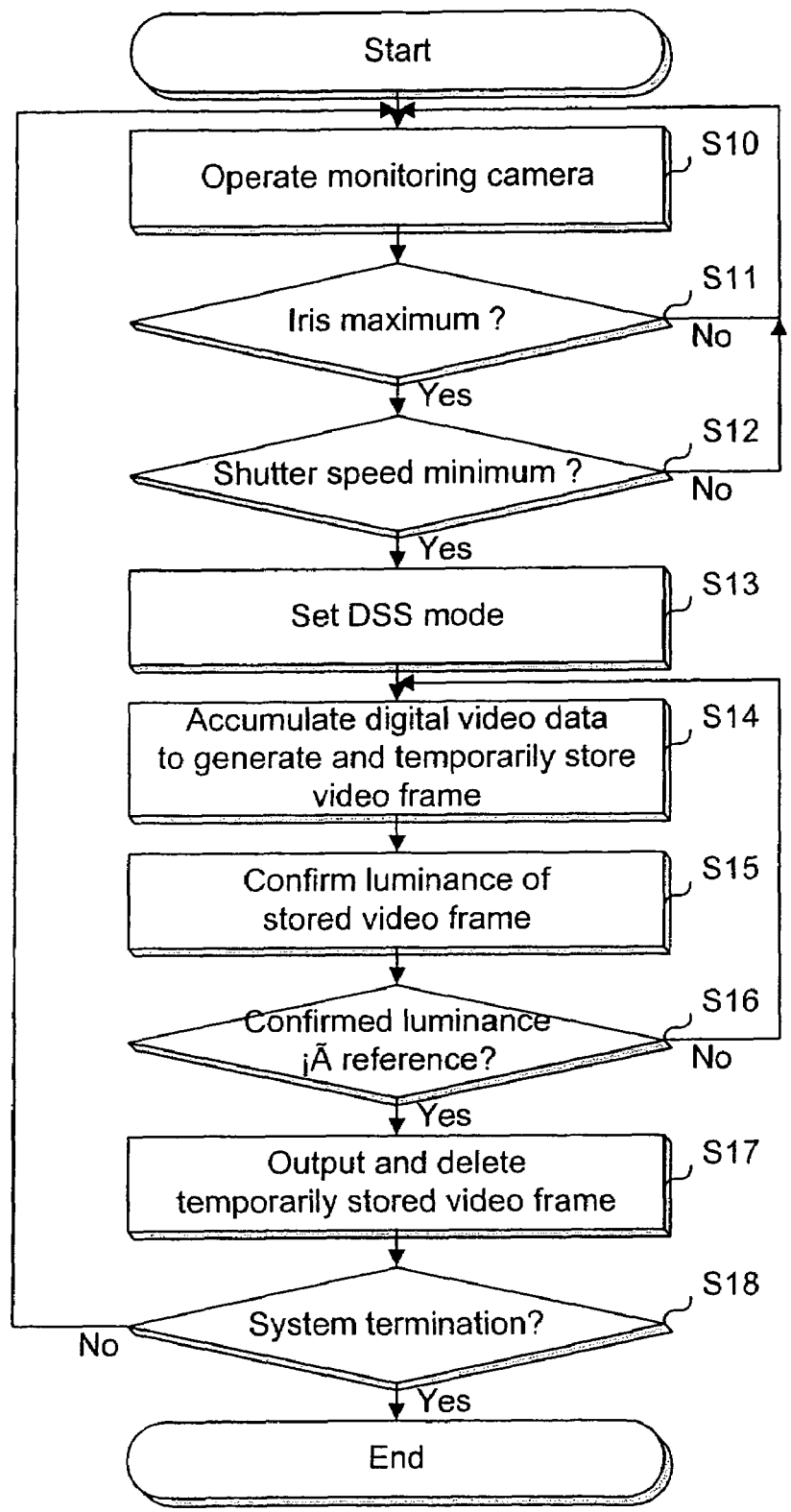
FIG. 2 is a flowchart illustrating the method for managing the DSS mode in the conventional monitoring camera.
Figure 3:
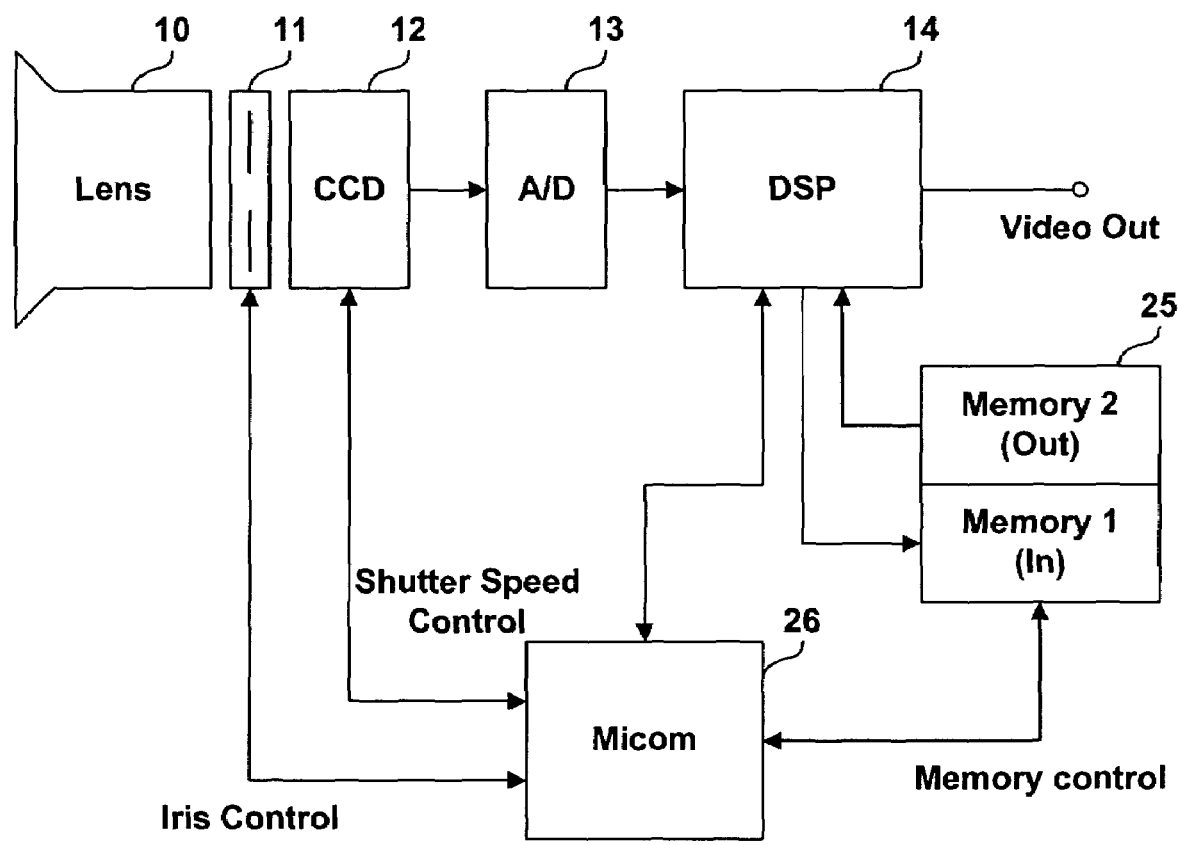
FIG. 3 is a block diagram illustrating the configuration of a monitoring camera to which a method for managing a DSS mode is applied in accordance with the present invention.

FIG. 3 is a block diagram illustrating the configuration of a monitoring camera to which a method for managing a DSS (Digital Slow Shutter) mode is applied in accordance with the present invention. Referring to FIG. 3, the monitoring camera includes a lens 10, an iris 11, a CCD (Charge Coupled Device) 12, an A/D (Analog-to-Digital) converter 13, a DSP (Digital Signal Processor) 14, a memory 25 and a microcomputer 26.

The memory 25 is divided into a first memory area (Memory 1 (In)) for storing a plurality of video frames and a second memory area (Memory 2 (Out)) for accumulating the plurality of video frames stored in the first memory area to output a single monitoring video frame, or can use two separate memories. Alternatively, the DSP 14 can receive the plurality of video frames stored in the memory 25, accumulate the received video frames, and generate and output a single monitoring video frame. In this case, the memory 25 does not need to be divided into the first and second memory areas.

Since an amount of light incoming through the lens 10 is small when the monitoring camera operates in a dark place where the luminance is very low, the microcomputer 26 performs an iris control operation for gradually opening the iris 11 so that an amount of incident light can be increased. Moreover, the microcomputer 26 performs a CCD shutter speed control operation for gradually reducing the shutter speed of the CCD 12 so that an electrical signal level based on photoelectric conversion of the CCD 12 can be set to a certain level appropriate for signal processing.

When the iris 11 is maximally opened and simultaneously, the shutter speed of the CCD 12 is minimum while the above-descried operation is carried out, the microcomputer 26 automatically sets the DSS mode. This will be described in detail.

Figure 4:
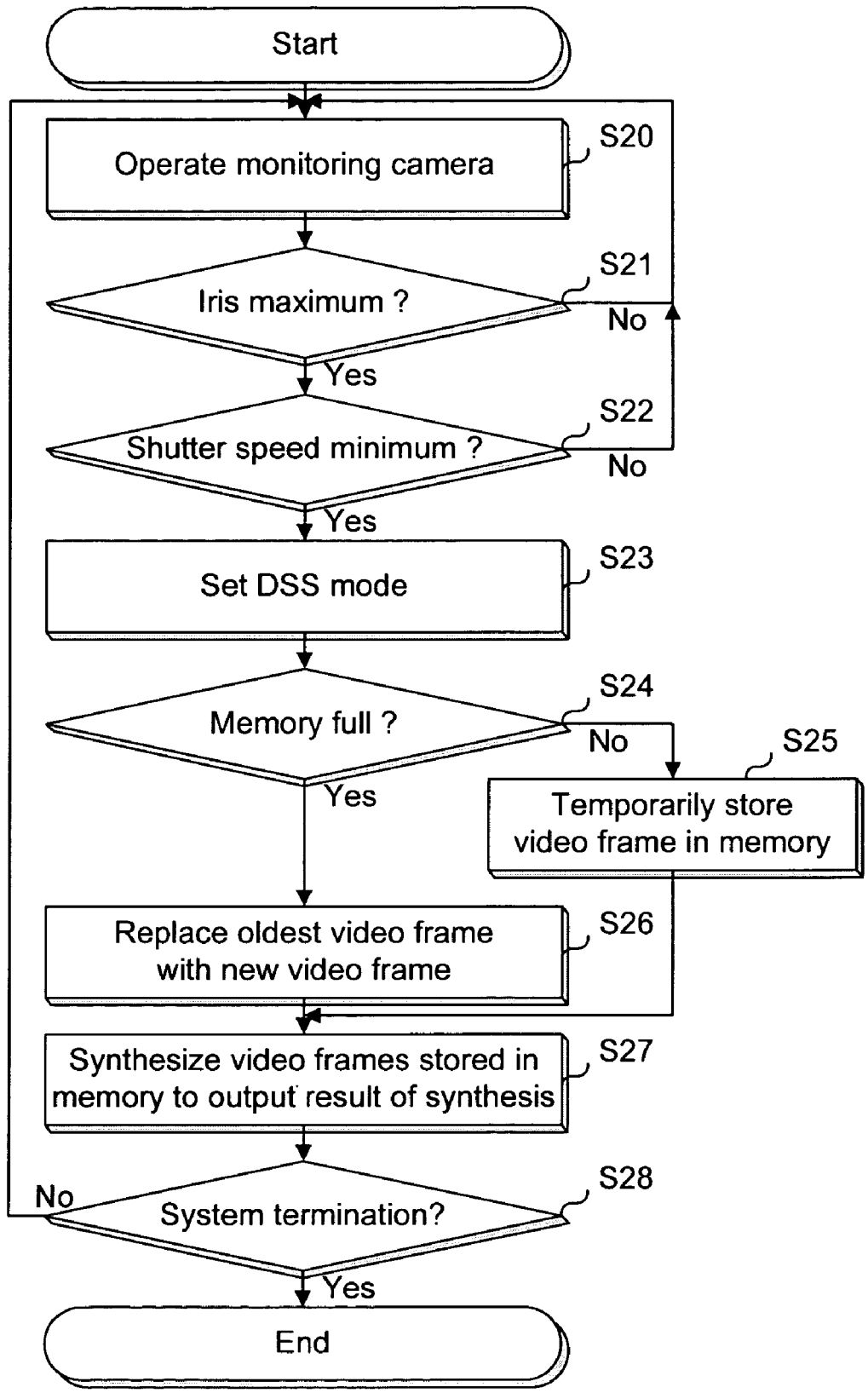
FIG. 4 is a flowchart illustrating the method for managing the DSS mode in the monitoring camera in accordance with the present invention.

FIG. 4 is a flowchart illustrating the method for managing the DSS mode in the monitoring camera in accordance with the present invention. Referring to FIG. 4, the monitoring camera installed in an arbitrary place performs a series of operations for outputting a video frame captured in a predetermined cycle, for example, in a 1/30-second cycle, as a monitoring video frame (S20). As described above, when the amount of light incoming through the lens 10 is small, the micro computer 26 performs the iris control operation for gradually opening the iris 11 and the CCD shutter speed control operation for gradually reducing the shutter speed of the CCD 12.

When the iris 11 is maximally opened (S21) and simultaneously, the shutter speed of the CCD 12 is minimum (S22) through the above-descried operation, the microcomputer 26 automatically sets the DSS mode (S23). The microcomputer 26 temporarily stores, in the memory 25, a video frame generated from the DSP 14 in a video frame unit (S25). The microcomputer 26 reads a plurality of temporarily stored video frames in a predetermined cycle, and the DSP 14 accumulates and synthesizes the read video frames to output a single monitoring video frame (S27).

Figure 5:
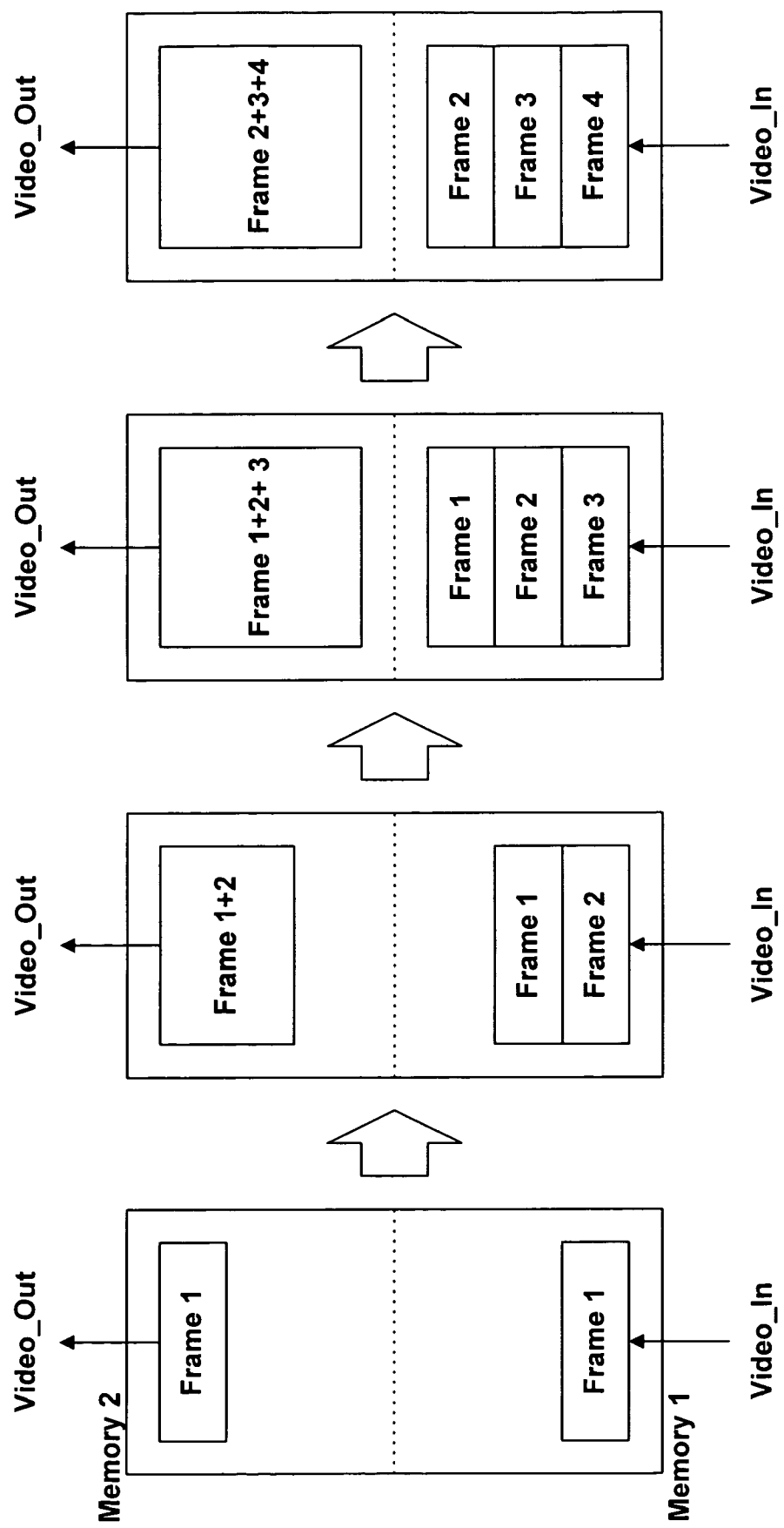
FIG. 5 shows a plurality of video frames stored by the method for managing the DSS mode in accordance with the present invention.

For example, as shown in FIG. 5, if a first video frame (Frame 1) is temporarily stored in the memory 25 when the DSS mode is set, the microcomputer 26 reads and outputs the first video frame (Frame 1) as a monitoring video frame (S25).

When the memory 25 is not full of the temporarily stored video frames or the number of video frames temporarily stored in the memory 25 is smaller than a predetermined value (S24), the microcomputer 26 stores consecutively captured second and third video frames (Frame 2 and Frame 3) along with the first video frame (S25). The stored video frames (Frame 1+2 or Frame 1+2+3) are read in a predetermined cycle, for example, a 1/30-second cycle, and the read video frames are outputted to the DSP 14. The DSP 14 performs synthesizing and signal-processing operations on the plurality of video frames (Frame 1+2 or Frame 1+2+3), and outputs a monitoring video frame based on a bright luminance (S27).

On the other hand, when the memory 25 is full of the temporarily stored video frames or the number of video frames temporarily stored in the memory 25 is equal to the predetermined value (S24), the microcomputer 26 controls a buffering operation of the memory 25 so that the oldest video frame is replaced with a newly captured video frame (S26). For example, as shown in FIG. 5, when a fourth video frame is newly inputted in a state in which the first to third video frames are stored, the microcomputer 26 deletes the first video frame as the oldest stored video frame from the memory 25. In place of the first video frame, the microcomputer 26 stores the newly captured fourth video frame in the memory 25 along with the second and third video frames (S26). The stored video frames (Frame 2+3+4) are read together, and then the read video frames are outputted to the DSP 14. The DSP 14 synthesizes the video frames to output a monitoring video frame based on a bright luminance level as a result of the synthesis (S27).

Until a system operation is terminated (S28), the microcomputer 26 iterates the above steps.

When a video frame is captured in a 1/30-second cycle, the microcomputer 26 can synthesize a plurality of video frames stored in the memory 25 in a 1/15 or 1/10-second cycle and output a monitoring video frame as a result of the synthesis.

When the plurality of video frames stored in the memory 25 are synthesized and then a single monitoring video frame is outputted, the outputted monitoring video frame is more brightly displayed by a multiple of the number of synthesized video frames as compared with an original video frame. The luminance of the monitoring video frame may be erroneously recognized as the luminance of an actual video frame. Thus, a luminance value of the monitoring video frame serving as a synthesis result is divided by the number of synthesized video frames and a result of the dividing is outputted so that the luminance of the actual video frame can be recognized.

When the luminance value of the monitoring video frame serving as the synthesis result is divided by the number of synthesized video frames and the result of the dividing is outputted, the effect of random noise present in each video frame can be removed.

Figure 6:
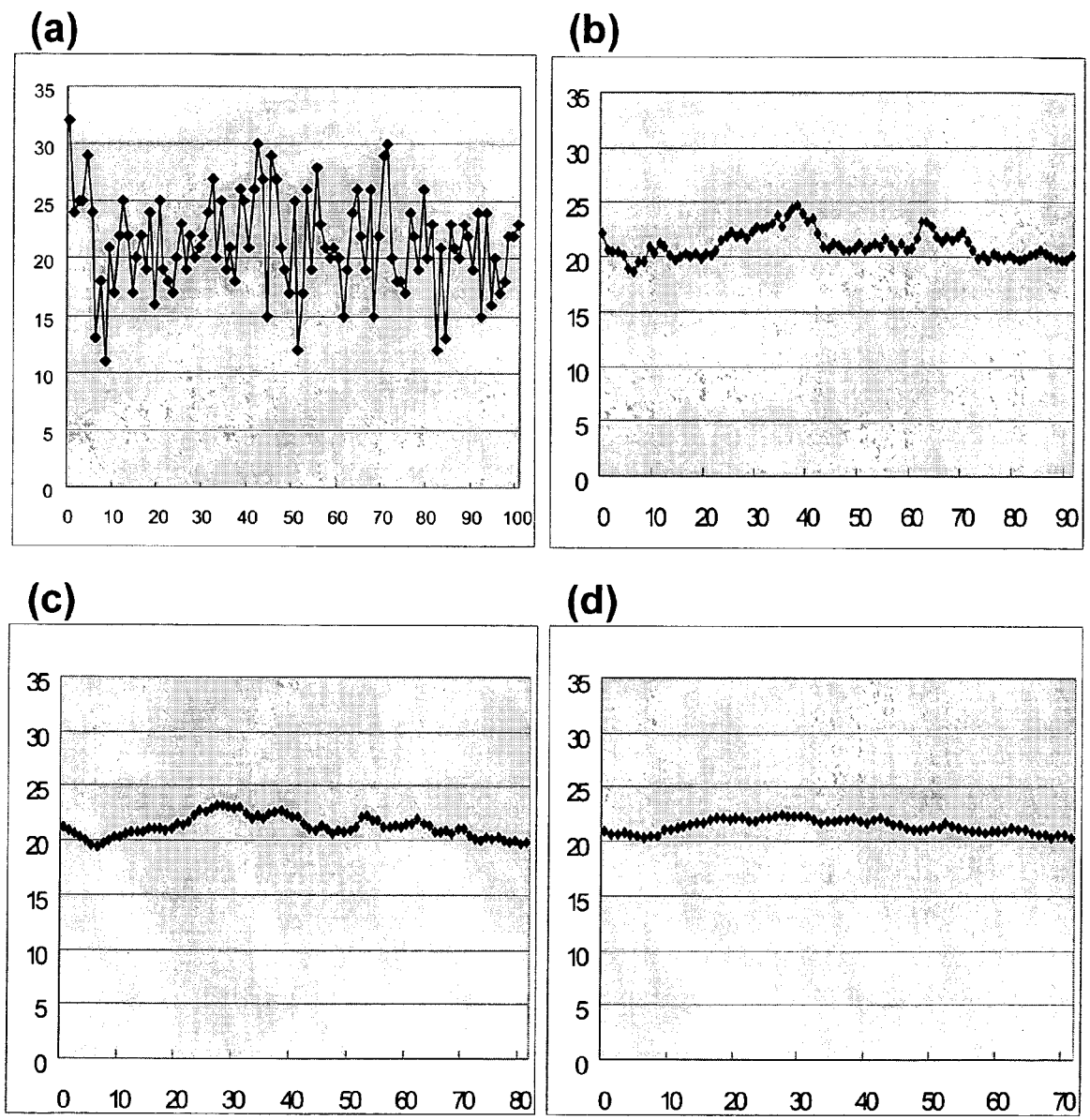
FIG. 6(a) is a graph illustrating time-lapse measurement of the luminance of a pixel within a video frame captured in a dark place.
FIGS. 6(b) to 6(d) are graphs illustrating luminance data of a pixel within an average video frame produced by synthesizing a predetermined number of video frames captured in the dark place.

When luminance values of pixels within video frames consecutively captured in a 1/30-second cycle in a dark place are measured, it can be seen that a difference between the luminance values varying with time is very great as shown in FIG. 6(a) in which the pixel luminance is represented by 8 bits corresponding to a value between a darkest luminance value 0 and a brightest luminance value 255. When the pixel is dark, the effect of random noise is great.

FIGS. 6(b), 6(c) and 6(d) show a pixel luminance varying with time in the case where the number of synthesized video frames is 10, 20 and 30. If a plurality of video frames are synthesized and pixel luminance values of the synthesized video frames are averaged, the effect of random noise can be reduced. In particular, it can be seen that the pixel luminance is maintained to a certain level when 30 video frames are synthesized. Thus, when the DSS mode operates in the dark place, a plurality of temporarily stored video frames in accordance with the present invention are synthesized, such that random noise included in luminance data of pixels can be significantly reduced.

As apparent from the above description, the present invention consecutively outputs a monitoring video frame in a predetermined cycle even though a monitoring camera operates in a DSS (Digital Slow Shutter) mode, thereby enhancing a monitoring function.

Moreover, the present invention accumulates and synthesizes a plurality of video frames temporarily stored in a memory to output a monitoring video frame, thereby outputting the monitoring video frame based on a bright luminance level.

Moreover, the present invention accumulates and synthesizes a plurality of video frames temporarily stored in a memory to output a monitoring video frame, thereby outputting the monitoring video frame from which random noise is significantly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing a DSS (Digital Slow Shutter) mode in a camera, comprising:
   controlling a size of an iris and a shutter speed based on a detected luminance;
   setting the DSS mode when the iris is maximally opened and the shutter speed is minimum;
   storing, in a memory, a plurality of video frames captured in the DSS mode according to a first predetermined cycle; and
   repeatedly performing the following steps:
   synthesizing the plurality of video frames stored in the memory at a second predetermined cycle to create a monitoring video frame, and
   outputting the monitoring video frame, including outputting a final monitoring video frame at a conclusion of said step of repeatedly performing,
   wherein each second predetermined cycle is identical in the DSS mode, and
   wherein the final outputted monitoring video frame is brighter than an original video frame stored in the memory.

2. The method of claim 1, wherein each of the plurality of video frames is stored in the memory in a video frame unit.

3. The method of claim 1, wherein an oldest stored video frame is replaced with a newly inputted video frame when the memory is full of the video frames.

4. The method of claim 1, wherein the first predetermined cycle relates to the shutter speed of the DSS mode.

5. The method of claim 1, wherein the second predetermined cycle is different from the first predetermined cycle.

6. The method of claim 1, wherein the second predetermined cycle is slower than the first predetermined cycle.

7. The method of claim 1, wherein the first predetermined cycle is 1/30 second and the second predetermined cycle is one of 1/10 second and 1/15 second.

8. The method of claim 1, wherein the step of repeatedly performing is performed until the memory is full of the temporarily stored video frames or until a number of video frames stored in the memory is equal to a predetermined value.

9. A digital camera having a (Digital Slow Shutter) DSS mode, comprising:
   an image capture portion having an iris and shutter, the image capture portion configured to capture a plurality of video frames in the DSS mode according to a first predetermined cycle;
   a memory configured to store the plurality of video frames; and
   a control processor configured to repeatedly perform the following steps:
   synthesize the plurality of video frames stored in the memory at a second predetermined cycle to create a monitoring video frame; and
   output the monitoring video frame, including outputting a final monitoring video frame at a conclusion of said step of repeatedly performing;
   wherein each second predetermined cycle is identical in the DSS mode;
   wherein the final outputted monitoring video frame is brighter than an original video frame stored in the memory; and
   wherein an iris size and a shutter speed is controlled by the control processor based on a detected luminance, and the DSS mode is set by the control processor in a state in which the iris is maximally opened and the shutter speed is minimum.

10. The digital camera of claim 9, wherein each of the plurality of video frames is stored in the memory in a video frame unit.

11. The digital camera of claim 9, wherein an oldest stored video frame is replaced with a newly inputted video frame when the memory is full of the video frames.

12. The digital camera of claim 9, wherein the first predetermined cycle relates to the shutter speed of the DSS mode.

13. The digital camera of claim 9, wherein the second predetermined cycle is different from the first predetermined cycle.

14. The digital camera of claim 9, wherein the second predetermined cycle is slower than the first predetermined cycle.

15. The digital camera of claim 9, wherein the first predetermined cycle is $1/30$ second and the second predetermined cycle is one of $1/10$ second and $1/15$ second.

16. The digital camera of claim 9, wherein the control processor is configured to repeatedly perform the steps until the memory is full of the temporarily stored video frames or until a number of video frames stored in the memory is equal to a predetermined value.

* * * * *